US007508156B2

(12) United States Patent
Mehlhorn

(10) Patent No.: US 7,508,156 B2

(45) Date of Patent: Mar. 24, 2009

(54) ELECTRICAL MACHINE HAVING A SERIES CHOPPER CIRCUIT

(75) Inventor: William Louis Mehlhorn, Menomonee Falls, WI (US)

(73) Assignee: A. O. Smith Corporation, Milwaukee, WI (US)

( * ) Notice: Subject to any disclaimer, the term of this patent is extended or adjusted under 35 U.S.C. 154(b) by 283 days.

(21) Appl. No.: 11/468,819

(22) Filed: Aug. 31, 2006

(65) Prior Publication Data

US 2007/0230926 A1 Oct. 4, 2007

Related U.S. Application Data

(60) Provisional application No. 60/744,208, filed on Apr. 4, 2006.

(51) Int. Cl.
*H02P 23/00* (2006.01)

(52) U.S. Cl. ....................... 318/701; 318/494; 318/807; 318/767

(58) Field of Classification Search ................. 318/254, 318/811, 701, 807, 767, 494; 388/811
See application file for complete search history.

(56) References Cited

U.S. PATENT DOCUMENTS 4,233,549 A 11/1980 Dighe
5,021,726 A 6/1991 Reinhardt et al.
5,345,160 A 9/1994 Corniere
5,672,950 A 9/1997 Kemp et al.
5,754,732 A 5/1998 Vlahu
5,764,024 A 6/1998 Wilson
5,940,576 A 8/1999 de Simon
5,949,202 A 9/1999 Vlahu
5,953,490 A 9/1999 Wiklund et al.
6,232,752 B1 * 5/2001 Bissell ....................... 323/225
6,271,691 B1 * 8/2001 Toyoda et al. ................. 327/77
6,294,900 B1 * 9/2001 Greenwood et al. ......... 323/222
6,320,358 B2 * 11/2001 Miller ........................ 323/222
6,329,785 B1 12/2001 Starkie et al.
6,626,002 B1 * 9/2003 Notohara et al. ........... 62/228.4
6,828,752 B2 12/2004 Nakatsugawa et al.
7,102,326 B1 * 9/2006 Chen et al. .................. 318/807
7,167,383 B2 * 1/2007 Iwakura et al. ................ 363/89
2004/0239272 A1 * 12/2004 Schulz et al. ............... 318/439
2006/0018138 A1 1/2006 Iwakura et al.
2006/0097687 A1 * 5/2006 Byrnes et al. ............... 318/751

FOREIGN PATENT DOCUMENTS

EP 0670628 9/1996

OTHER PUBLICATIONS

Motor Control, a reference guide, Feb. 2004, STMicroelectronics, Italy.

* cited by examiner

*Primary Examiner*—Bentsu Ro
*Assistant Examiner*—David S Luo
(74) *Attorney, Agent, or Firm*—Michael Best & Friedrich LLP

(57) ABSTRACT

A controller and a motor assembly having a controller. The controller includes a first switch assembly in a series configuration with the motor, where the first switch assembly has a first transistor, a second switch assembly in a parallel configuration with the motor, where the second switch assembly has a second transistor, and a control circuit electrically connected to the first transistor and to the second transistor to control the first switch assembly and the second switch assembly to provide a chopped voltage to a motor.

33 Claims, 7 Drawing Sheets

58
60
65
95
TO BLOWER MOTOR
BRIDGE CIRCUIT
DRIVER CIRCUIT
DEADBAND GENERATOR
FROM POWER LINE
EMI FILTER
85
70
75
80
POWER SUPPLY
CURRENT LIMITER
PWM GENERATOR
100
90
UNDERVOLTAGE LOCKOUT
SPEED COMMAND
102

100
Power Supply
+12V
R7
C12
C14
D1
65
R16
C11
C13
D2
Bridge Circuit
Deadband Generator
U2D
U1A
R5
C4
85
R11
U3
R14
R21
Q4
D10
D3
D4
D5
J1-1 Motor Chopped
C2
R6
R12
Q3
J1-2 Motor Hot
L1
SW1
F1
J1-3 Line Hot
R24
Q6
R20
D12
R19
102
U1D
C15
R1
D11
C5
U1B
C1
U4
R15
R22
Q5
D9
D6
D7
D8
C19
C16
MOV1
J1-4 Line Com
C18
C17
J1-5 Earth
Undervoltage Lockout
Driver Circuit
95
R17
EMI Filter
75
R2
R3
Q2
C6
U2B
U2C
R13
R25
P1
Speed Command
C3
C10
U5A
U1C
R8
C8
U2A
C9
R4
C7
U5B
58
90
Current Limiter
80
PWM Generator

MOTOR VOLTAGE WITH SERIES CHOPPER CONTROL

MOTOR VOLTAGE WITH TRIAC CONTROL (PRIOR ART)

75
90
95
225
85
102
80
230
235
Bridge Circuit
Power Supply
EMI Filter
Current Limiter
Driver Circuit
Deadband Generator
Undervoltage Lockout
PWM Speed Command to Voltage Converter
PWM Generator
J2-2 Motor Chopped
J2-1 Motor Hot
J1-3 Line Hot
J1-2 Line Com
J1-1 Earth
J2-3 Earth

ELECTRICAL MACHINE HAVING A SERIES CHOPPER CIRCUIT

RELATED APPLICATIONS

This application claims the benefit of U.S. Provisional Patent Application No. 60/744,208; filed on Apr. 4, 2006.

BACKGROUND

Traditionally, low cost speed control of single phase induction motors has been accomplished by motor voltage reduction utilizing a triac. More specifically, the motor slows down as the terminal voltage to the motor is reduced. This technique works well for loads, such as fans and centrifugal pumps, where the load torque required drops smoothly and rapidly as speed is reduced.

One prior art triac control reduces the motor voltage by delaying conduction until after the line voltage crosses zero. At some point after the zero crossing, the triac is switched on (as determined by the control), and it remains on until the current in the triac goes to zero. This process is repeated every ½ cycle of the line voltage.

SUMMARY

In one embodiment, the invention provides a controller for controlling an electric motor. The controller includes a first switch assembly connectable in a series configuration with the motor, where the first switch assembly has a first transistor configured to control the first switch assembly at least between a first state and a second state, and a second switch assembly connectable in a parallel configuration with the motor, where the second switch assembly has a second transistor configured to control the second switch assembly at least between the first state and the second state. The controller also includes a control circuit electrically connected to the first transistor and to the second transistor to control the first switch assembly and the second switch assembly, respectively, the control circuit being configured to control the first and second switch assemblies to provide a chopped voltage to the motor.

In another embodiment, the invention provides a controller operable to control a motor. The controller includes a first switch assembly configured in a series arrangement with the motor. The first switch assembly has a sensor to detect a characteristic of the power supplied to the motor and a first MOSFET operable to control the first switch assembly between a first state and a second state. The controller also includes a second switch assembly configured in a parallel arrangement with the motor. The second switch assembly has a second MOSFET operable to control the second switch assembly between the first state and the second state. The controller also includes a control circuit operable to control the first MOSFET to switch the first switch assembly from the first state to the second state, and the second MOSFET to switch the second switch assembly from the second state to the first state to provide a chopped voltage to the motor.

In another embodiment, the invention provides a motor assembly including an electric motor and a controller operable to control the electric motor. The controller includes a first switch assembly connectable in a series configuration with the electric motor, where the first switch assembly has a first transistor configured to control the first switch assembly at least between a first state and a second state, and a second switch assembly connectable in a parallel configuration with the electric motor, where the second switch assembly has a second transistor configured to control the second switch assembly at least between the first state and the second state. The controller also includes a control circuit electrically connected to the first transistor and to the second transistor to control the first switch assembly and the second switch assembly, respectively, the control circuit being configured to control the first and second switch assemblies to provide a chopped voltage to the electric motor.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
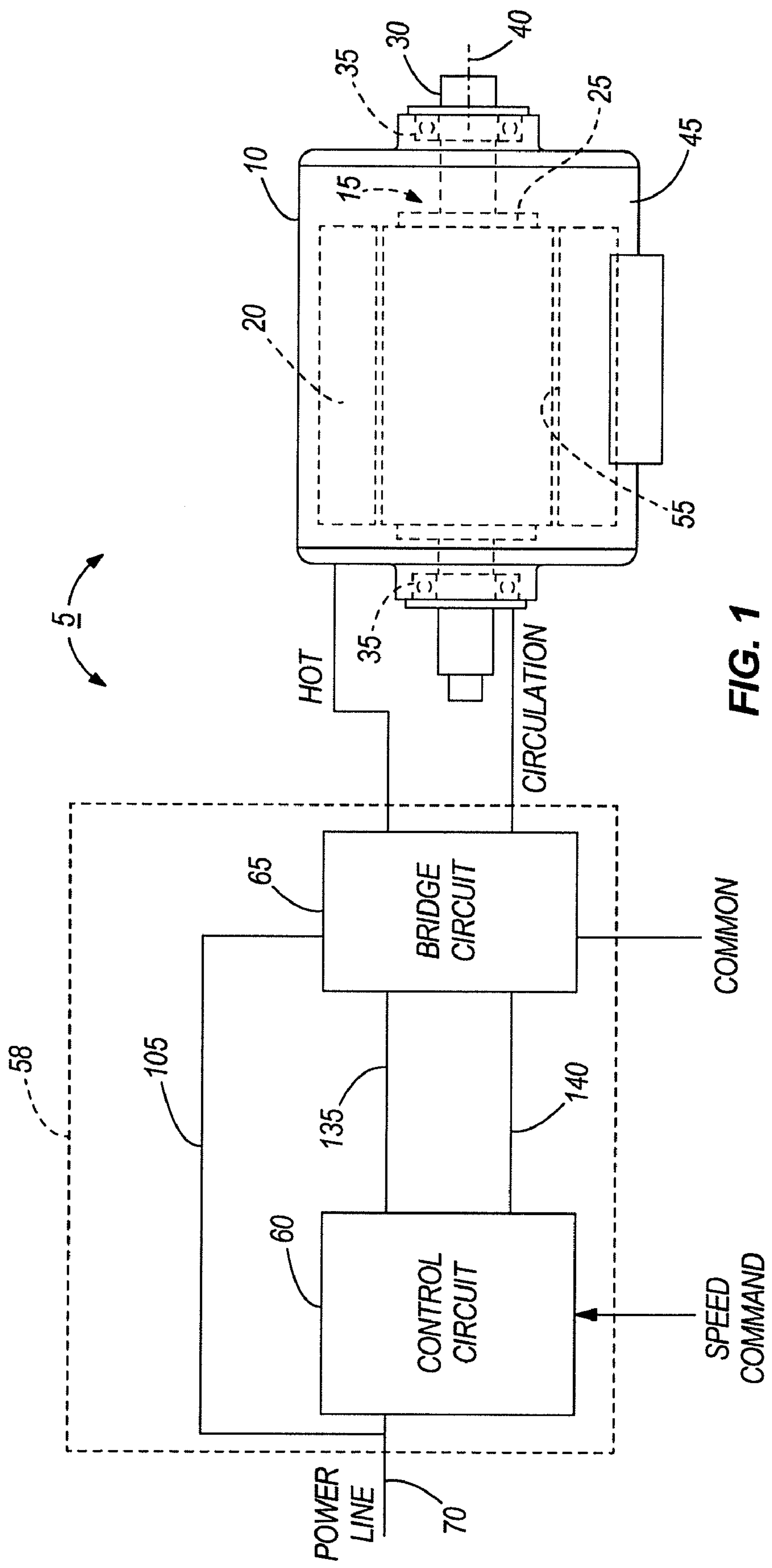
FIG. 1 is a partial block diagram, partial side view of an electrical machine having a motor coupled to a controller.

An electrical machine 5 is illustrated in FIG. 1. The machine 5 includes a motor 10, which generally includes a rotor 15 and a stator 20. The motor 10 will be described herein as a single phase induction motor having the rotor 15 substantially disposed within the stator 20. However, other motor types and other motor configurations can be used with the invention, and unless explicitly limited otherwise, the motor type and motor configuration are not intended to be limited to the motor shown in FIG. 1 and described herein.

The rotor 15 includes a rotor core 25 and a shaft 30 that extends from one or both ends of the rotor core 25. The shaft 30 provides support points and a convenient shaft power take off point (e.g., for a blower or fan). Generally, two or more bearings 35 engage the shaft 30 and support the rotor 15 such that it rotates about a rotational axis 40. The motor 10 also includes a housing 45 that supports the stator 20. The stator 20 defines a substantially cylindrical aperture 55 that is centered on the rotational axis 40. When the rotor 15 is in its operating position relative to the stator 20, the rotor core 25 is generally centered within the aperture 55 such that a small air gap is established between the rotor core 25 and the stator 20. The air gap allows for relatively free rotation of the rotor 15 within the stator 20.

The rotor 15 includes one or more conductors configured to provide an induction-styled rotor (e.g., a squirrel cage rotor). The stator 20 includes conductors (e.g., wire) forming one or more windings that can be selectively energized to produce a varying magnetic field. The rotor 15 responds to the varying magnetic field with a second varying magnetic field, the two of which interact to produce rotor rotation.

As schematically illustrated in FIG. 1, the motor 10 is connected to a controller 58. The controller 58 includes a control circuit 60 for controlling the motor 10 though a bridge circuit 65. The control circuit 60 receives power from a power line 70, which can be relayed to the bridge circuit 65 and the motor 10. The control circuit 60 also receives a speed command from a user interface. It is possible for the control circuit 60 to include input/output interfaces in addition to the ones illustrated in FIG. 1. The connections 135 and 140 schematically illustrate the connections between the bridge circuit 65 and the control circuit 60. Additionally, the lines labeled "HOT" and "CIRCULATION" schematically illustrate the connections between the bridge circuit 65 and the motor 10.

Figure 2:
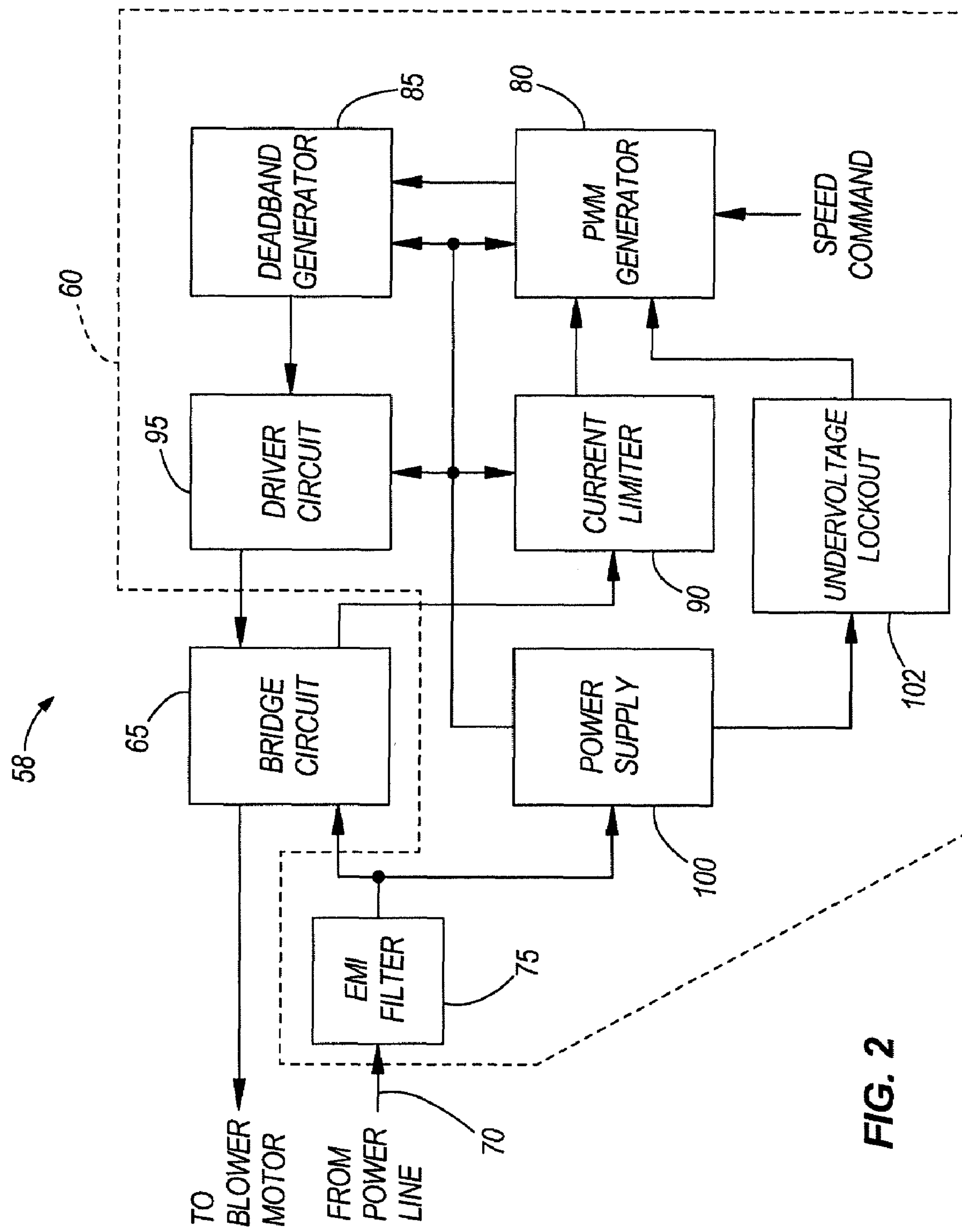
FIG. 2 is a block diagram of the controller of FIG. 1.
Figure 3:
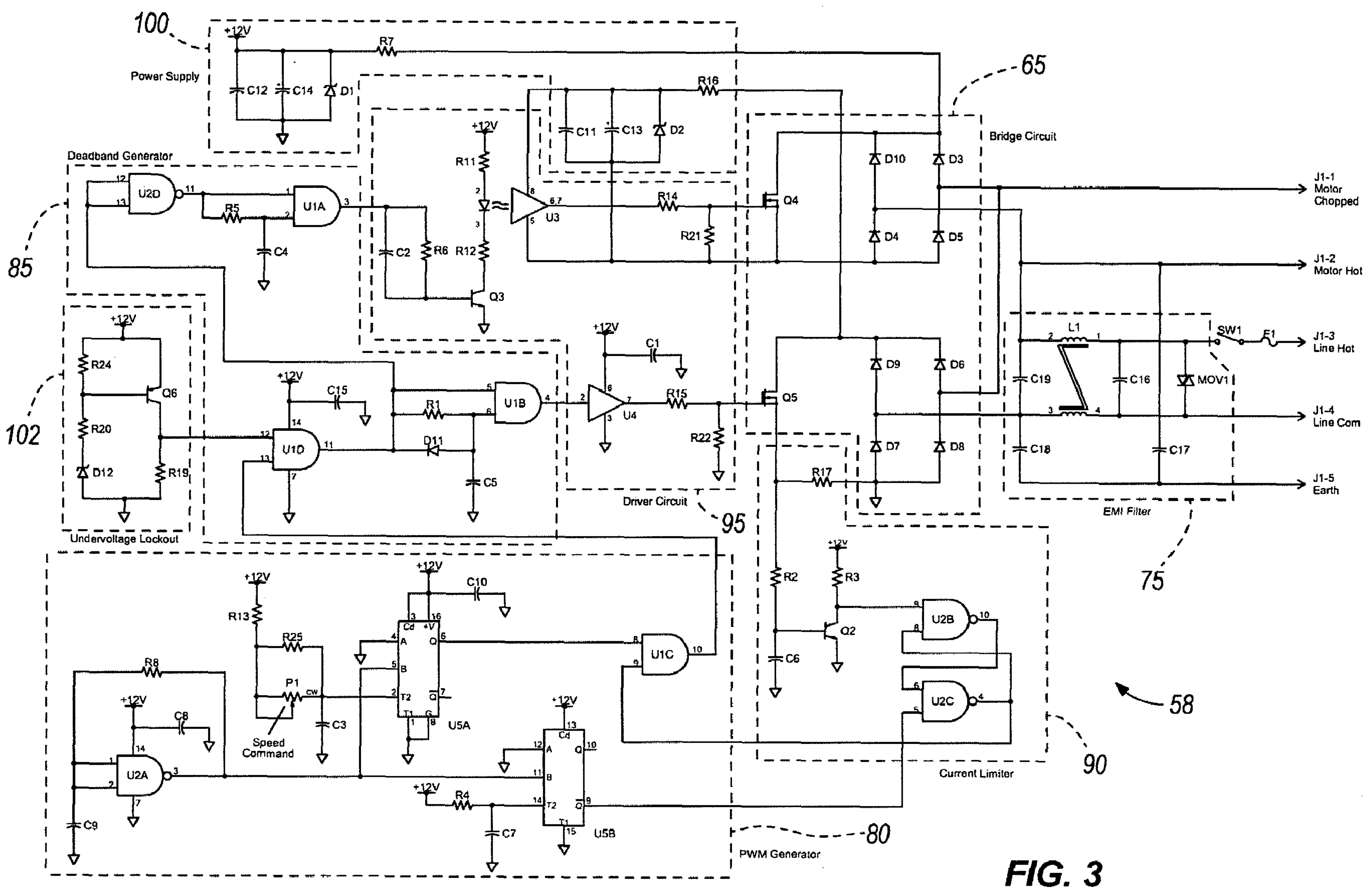
FIG. 3 is a circuit schematic of the controller of FIG. 1.

FIG. 2 illustrates a block diagram of the control circuit 60 and the bridge circuit 65, and FIG. 3 illustrates a circuit diagram of the control circuit 60 and the bridge circuit 65. More specifically, the controller 58 includes the bridge circuit 65 and the control circuit 60 to control two active switches (shown in FIG. 4) of the bridge circuit 65. The control circuit 60 and the bridge circuit 65 do not require energy storage devices, such as bus capacitors or the like, which helps to keep the size and cost of the circuits relatively low.

With reference to FIGS. 2 and 3, the control circuit 60 includes an electromagnetic interference (EMI) filter 75, a pulse width modulation (PWM) generator 80 having an oscillator and a pulse width generator, a deadband generator 85, a current limiter 90, a driver circuit 95, a power supply 100, and an under-voltage lockout circuit 102. The current limiter 90 generally helps prevent problems during a locked-rotor situation. The current limiter 90 turns off the PWM generator 80 when the line (or motor) current becomes higher than a predetermined amount, for example 2.5 amps.

Before proceeding further, it should be understood that FIG. 3 shows one construction of the control circuit of FIG. 2. It should be understood that other constructions are possible, including adding or removing of circuit elements and/or blocks, combining circuit elements in one or more circuit packages (such as an application specific integrated circuit), and using one or more microcontrollers, programmable devices, and/or similar components.

The under-voltage lockout circuit 102 keeps the driver circuit 95 and the bridge circuit 65 from turning on before the power supply 100 is fully charged. In general, the under-voltage lockout circuit 102 is used to help insure that elements of the control circuit 60 and the bridge circuit 65 are in a stable condition before allowing the bridge circuit 65 to start conducting current from the power line 70 to the motor 10.

The power supplied from the power line 70 is processed by the EMI filter 75 and branches into multiple lines. One line goes to the power supply 100 to power the low voltage circuitry. More specifically, the power supply 100 powers the current limiter 90, the driver circuit 95, the PWM generator 80, the under-voltage lockout circuit 102, and the deadband generator 85. The power supply 100 can also power other elements not shown. The other line (labeled with numeral 105 in FIG. 1) goes to the bridge circuit 65.

Figure 4:
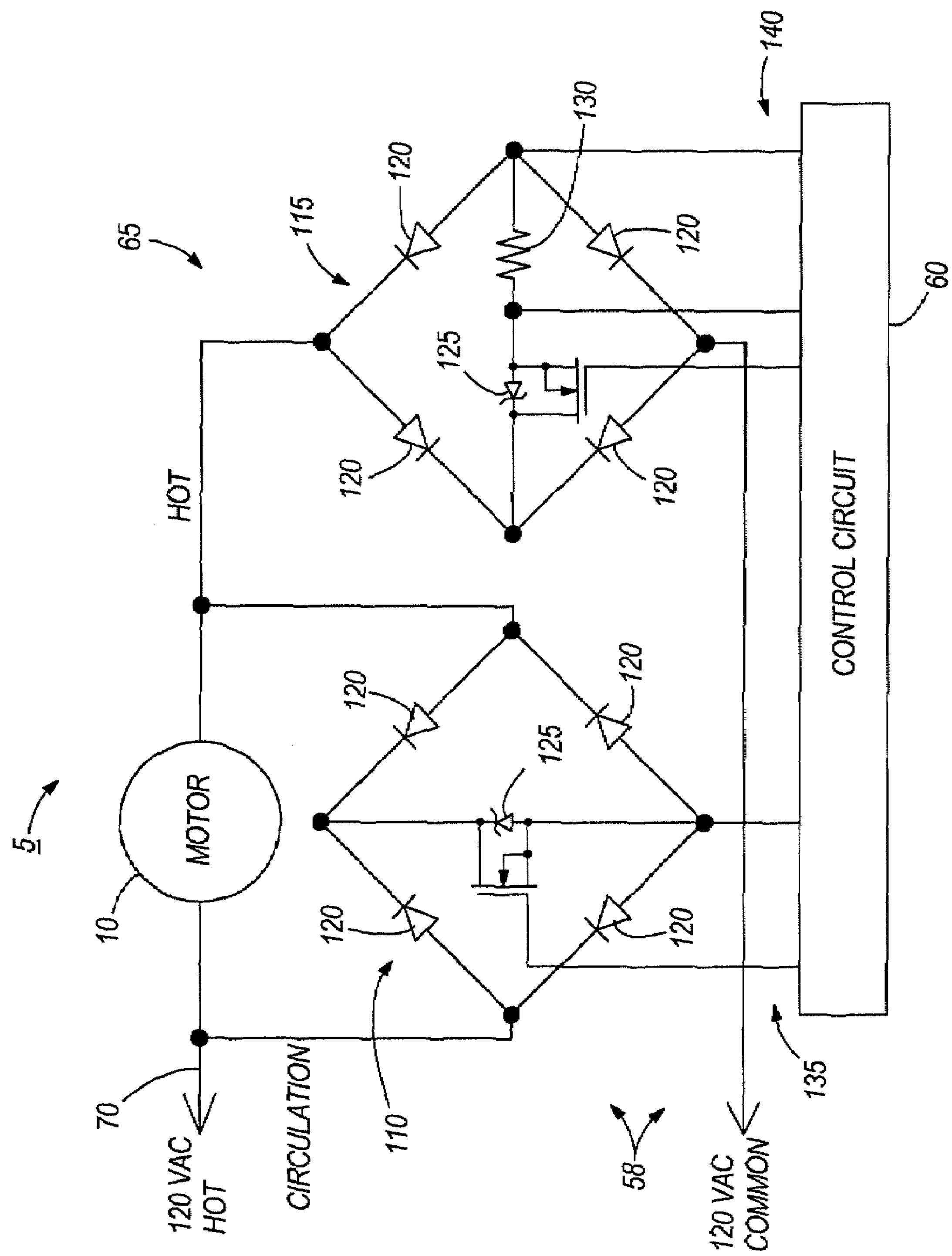
FIG. 4 is a partial block diagram, partial circuit schematic of the machine of FIG. 1.
Figure 5B:
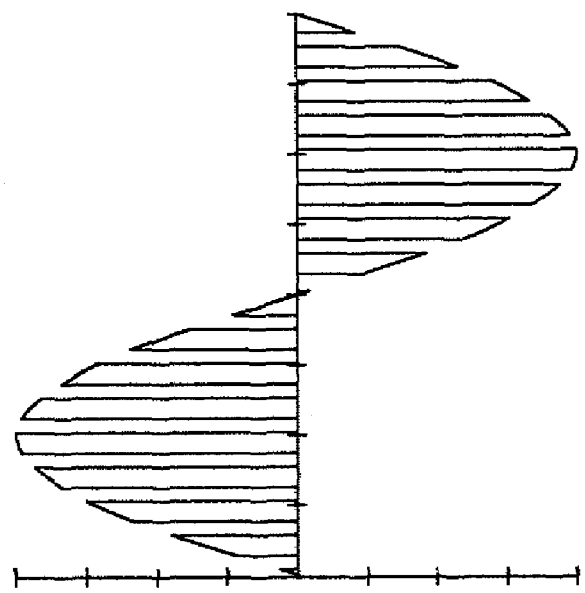
FIG. 5B is an illustration of motor voltage generated by the controller of FIG. 1.
Figure 5A:
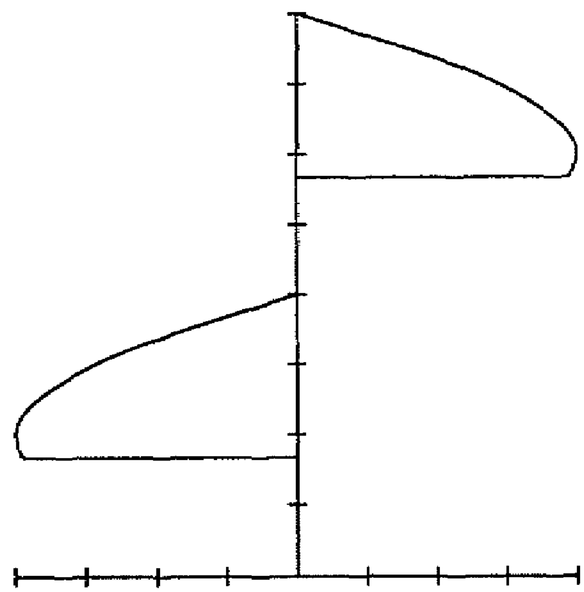
FIG. 5A is an illustration of motor voltage with the prior art triac control.

FIG. 4 illustrates the bridge circuit 65 having two bidirectional switches (also referred to herein as switch assemblies). One of the bidirectional switches is a circulating switch 110 in a parallel configuration with the motor 10. The other bidirectional switch is a main switch 115 connected in a series configuration with the motor 10. The circulating switch 110 and the main switch 115 each includes four fast recovery diodes 120 connected in a full wave bridge configuration, and a MOSFET transistor 125. Additionally, the main switch 115 includes a resistor 130, operating as a current sensor, in a series configuration with the MOSFET transistor 125. Alternatively, the circulating switch 110 and the main switch 115 can include a snubbered IGBT to replace the MOSFET 125 or to operate in combination with the MOSFET 125. L FIG. 5B illustrates the input line voltage provided from the power line 70 to the motor 10 using the control circuit 60 and the bridge circuit 65. The input line voltage illustrated in FIG. 5B is relatively smoother and is chopped at a much higher frequency in comparison to the voltage illustrated in FIG. 5A. With reference to FIG. 5B, by chopping the voltage at a relatively higher frequency (e.g., a 15 kHz rate) and by doing that chopping throughout the input sine wave, the result is an essentially sinusoidal waveform of reduced voltage being fed to the motor 10. As a consequence, noise generating harmonics are significantly reduced since a chopping frequency of 15 kHz is substantially outside the range of human hearing, thus helping eliminate noise.

The inventors have tested the invention on a range hood having the electrical machine 5. With a motor powered by the prior art triac control, the motor noise was in the range of 70 dBA. The prior art triac control produced a line voltage similar to the one illustrated in FIG. 5A. When the same motor was powered with the control circuit 60 and the bridge circuit 65, the motor noise dropped to around 55 dBA, indicating an approximate 15 dBA reduction in noise.

During operation of the motor 10 in FIGS. 1 and 4, the main switch 115 generally supplies line voltage to the motor 10. In the case when the main switch 115 is not on, the circulating switch 110 is on. The circulating switch 110 gives a path for the current of motor 10 to keep circulating when the main switch 115 is off. It is important for at least one of the bidirectional switches 110, 115 to be on at all times so that motor current can flow continuously. It is also important for both bidirectional switches 110, 115 not to be on at the same time. If both switches are on simultaneously, the power line 70 could be shorted by the bridge circuit 65. As a consequence, the deadband generator 85 is implemented to create a small period of time when neither of the bidirectional switches 110, 115 are on. MOSFET transistors 125 allow the deadband time to be kept to a minimum. MOSFETs also have an avalanche rating, which means that they can absorb voltage spikes inherent with an inductive load like the motor 10 when both the bidirectional switches 110, 115 are off. Other bidirectional switches having avalanche capabilities can be used in place of the switches 110, 115. When powering down the controller 58, the under-voltage lockout circuit 102 helps assure the main switch 115 is off and the circulating switch 110 is on. This procedure allows the motor current to decay at a relatively slow pace, thus avoiding voltage spikes on the MOSFET transistors 125.

Figure 6:
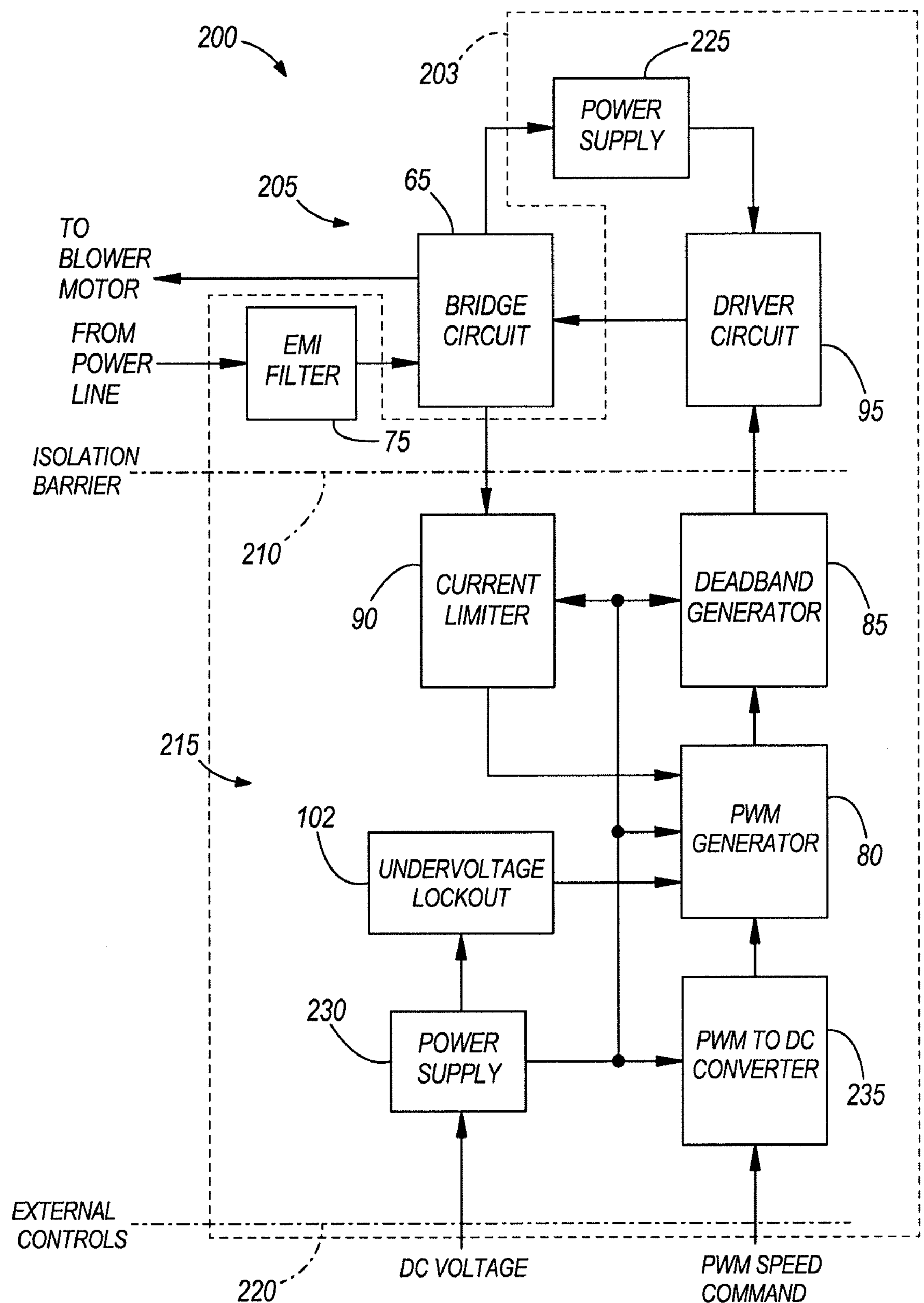
FIG. 6 is a block diagram of an alternate chopper control circuit.

FIG. 6 illustrates a block diagram of an alternate controller 200 having the bridge circuit 65, including the circulating switch 110 and the main switch 115 (shown in FIG. 4), and the control circuit 203. The controller 200 is configured to control the motor 10 and includes a power line circuit 205, an isolation barrier 210, a low voltage circuit 215, and external controls 220. The isolation barrier 210 is generally operable to at least partially separate or isolate the low voltage circuit 215 from the power line circuit 205. The isolation barrier 210 may have any shape or configuration, and include any material necessary to separate or isolate the low voltage circuit 215 from the power line circuit 205. The external controls 220 schematically shown in FIG. 6 are operable to interact with the low voltage circuit 215 to receive at least one of a DC voltage and a speed command (also identified as a PWM speed command). The external controls 220 may also include any suitable mechanisms to interact with other systems, such as an external controller or a power supply, or with a user to input a speed command to control the motor 10.

In reference to the circuit elements illustrated in FIGS. 2-3 and 6-7, common elements between the controller 58 and to controller 200 are identified with the same numerals for ease of description, though it is possible that the actual configuration of each of these common elements may differ from the controller 58 to the controller 200.

Figure 7:
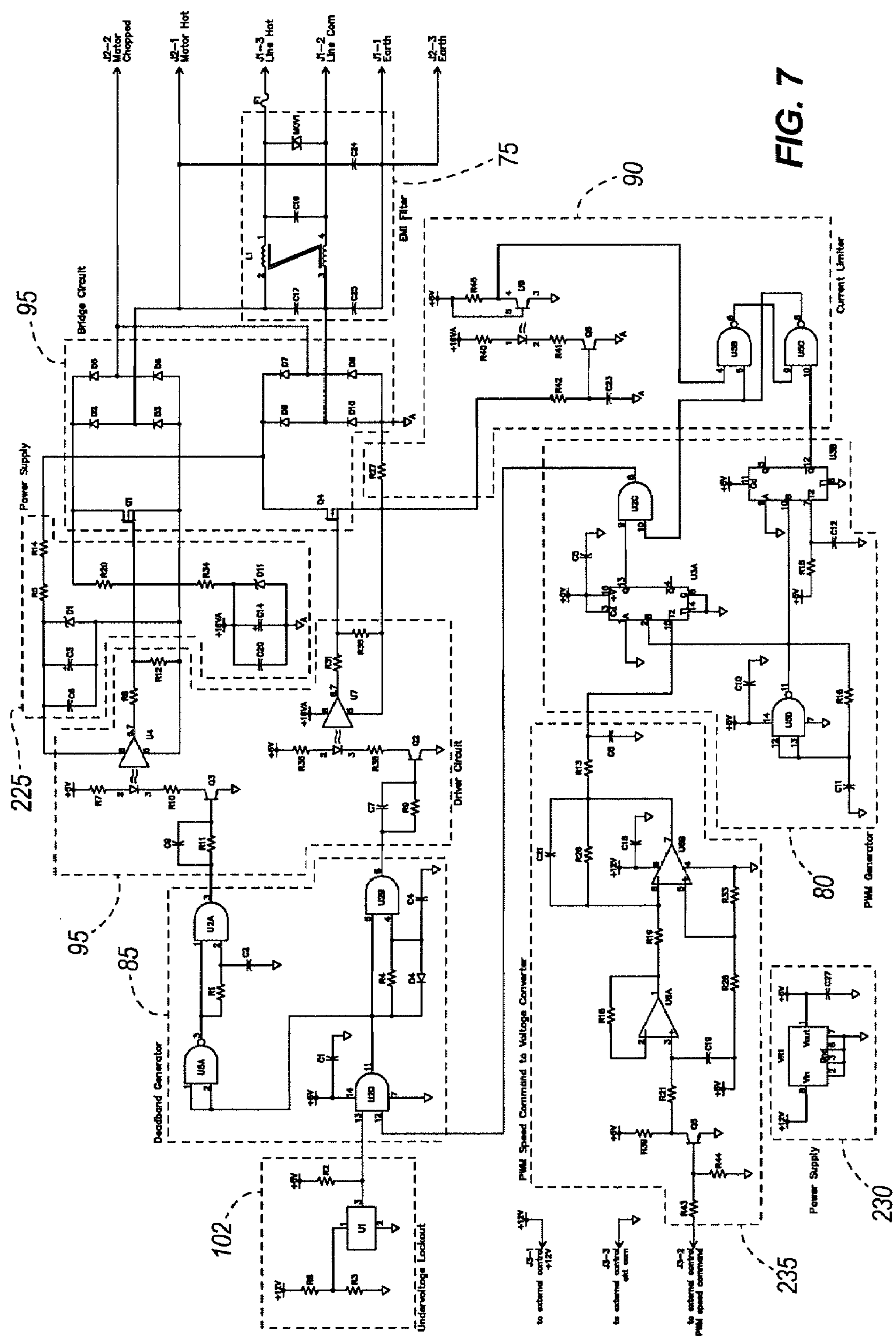
FIG. 7 is a circuit schematic of the block diagram shown FIG. 6.

With reference to FIGS. 6-7, the power line circuit 205 includes an EMI filter 75, a driver circuit 95, a first power supply 225, and the bridge circuit 65. The low voltage circuit includes a current limiter 90, a deadband generator 85, PWM generator 80, under-voltage lockout 102, a second power supply 230, and a PWM to DC converter 235. The second power supply 230 receives a DC voltage to power the elements of the low voltage circuit 215 through the external controls 220. Also through the external controls 220, a user can input a speed command, which is received by the PWM to DC converter 235. The PWM to DC converter 235 usually generates a DC voltage in response to receiving the speed command, as shown in FIG. 6.

In reference to FIGS. 2 and 6, the controller 58 is generally configured to operate the motor 10 as a stand alone system while the controller 200 is generally configured to operate based on an external (received though the external controls) speed command. For example, in a stand alone configuration of the controller 58, it is possible that the controller 58 includes a memory (not shown) having instructions, such as speed commands. It is also possible that the controller 58 determines the speed commands based on monitored characteristics of the motor 10. In another example, in an interactive configuration of the controller 200, the low voltage circuit 215 can receive speed commands from a user as well from an external controller through an interface (not shown) of the external controls 220. It is to be understood that the stand alone configuration and the interactive configuration are only exemplary and that the controller 58 and the controller 200 can include or be configured to operate in other configurations. The above-mentioned configurations, and any other configurations, of the controller 58 and the controller 200 are generally included in motor assemblies including a motor 10, such as a single-phase PSC motor, a single-phase shaded pole motor, and a universal motor. It is also within the scope of the invention that the controller 58 and the controller 200 may be included in motor assemblies having other types of electric motors.

Various features and advantages of the invention are set forth in the following claims.

What is claimed is:

1. A controller for controlling an electric motor, the controller comprising:

a first switch assembly connectable in a series configuration with the motor, the first switch assembly having a first transistor configured to control the first switch assembly at least between a first state and a second state;

a second switch assembly connectable in a parallel configuration with the motor, the second switch assembly having a second transistor configured to control the second switch assembly at least between the first state and the second state; and a control circuit electrically connected to the first transistor and to the second transistor to control the first switch assembly and the second switch assembly, respectively, the control circuit configured to control the first and second switch assemblies for providing a chopped voltage to the motor, wherein at least one of the first switch assembly and the second switch assembly includes a set of four diodes in a full-wave rectifier configuration.

2. The controller of claim 1, wherein at least one of the first switch assembly and the second switch assembly is configured to be a bidirectional switching element.

3. The controller of claim 2, wherein the first transistor and the second transistor include at least one of a snubbered IGBT element and a MOSFET.

4. The controller of claim 1, wherein the first transistor and the second transistor include at least one of a snubbered IGBT element and a MOSFET.

5. The controller of claim 1, wherein at least one of the first switch assembly and the second switch assembly includes a sensor to detect a current supplied to the motor.

6. The controller of claim 5, wherein at least one of the first switch assembly and the second switch assembly is configured to be a bidirectional switching element.

7. The controller of claim 5, wherein the first transistor and the second transistor include at least one of a snubbered IGBT element and a MOSFET.

8. The controller of claim 5, wherein the control circuit is operable to supply a speed command to control the first switch assembly and the second switch assembly, and includes at least one of an EMI filter, a power supply, a driver circuit, a current limiter, a deadband generator, an under-voltage lockout circuit, and a PWM generator.

9. The controller of claim 5, wherein the control circuit includes a low voltage circuit, a power line circuit, an isolator barrier to at least partially separate the power line circuit and the low voltage circuit, and external controls.

10. The controller of claim 1, wherein the control circuit is operable to supply a speed command to control the first switch assembly and the second switch assembly, and includes at least one of an EMI filter, a power supply, a driver circuit, a current limiter, a deadband generator, an under-voltage lockout circuit, and a PWM generator.

11. The controller of claim 1, wherein the control circuit includes a low voltage circuit, a power line circuit, an isolator barrier to at least partially separate the power line circuit and the low voltage circuit, and external controls.

12. The controller of claim 11, wherein the power line circuit is operable to relay power from a power line to the motor and includes at least one of an EMI filter, a driver circuit, and a first power supply.

13. The controller of claim 11, wherein the low voltage circuit includes at least one of a current limiter, a deadband generator, a PWM generator, and under-voltage lockout circuit, a PWM to DC converter circuit, and a second power supply, and wherein the low voltage circuit interacts with the external controls to receive at least one of a DC voltage to operate the low voltage circuit and a speed command to operate the motor.

14. A controller operable to control a motor, the controller comprising:

a first switch assembly configured in a series arrangement with the motor, the first switch assembly including a sensor to detect a characteristic of the power supplied to the motor and a first MOSFET operable to control the first switch assembly between a first state and a second state;

a second switch assembly configured in a parallel arrangement with the motor, the second switch assembly including a second MOSFET operable to control the second switch assembly between the first state and the second state; and a control circuit operable to control the first MOSFET to switch the first switch assembly from the first state to the second state, and the second MOSFET to switch the second switch assembly from the second state to the first state to provide a chopped voltage to the motor, wherein at least one of the first switch assembly and the second switch assembly includes a set of four diodes in a full-wave rectifier configuration.

15. The controller of claim 14, wherein the control circuit is operable to generate a speed command to control the motor, and includes at least one of an EMI filter, a power supply, a driver circuit, a current limiter, a deadband generator, an under-voltage lockout circuit, and a PWM generator.

16. The controller of claim 14, wherein the control circuit includes a low voltage circuit, a power line circuit, an isolator barrier at least partially separating the low voltage circuit and the power line circuit, and external controls coupled to the low voltage circuit, the external controls operable to receive a DC voltage and a speed command to control the motor.

17. The controller of claim 16, wherein the power line circuit is operable to relay power from a power line to the motor and includes at least one of an EMI filter, a driver circuit, and a first power supply.

18. The controller of claim 16, wherein the low voltage circuit includes at least one of a current limiter, a deadband generator, a PWM generator, under-voltage lockout circuit, a PWM to DC converter circuit, and a second power supply.

19. A motor assembly comprising:

an electric motor; and a controller operable to control the electric motor, the controller including a first switch assembly connectable in a series configuration with the electric motor, the first switch assembly having a first transistor configured to control the first switch assembly at least between a first state and a second state;

a second switch assembly connectable in a parallel configuration with the electric motor, the second switch assembly having a second transistor configured to control the second switch assembly at least between the first state and the second state; and a control circuit electrically connected to the first transistor and to the second transistor to control the first switch assembly and the second switch assembly, respectively, the control circuit configured to control the first and second switch assemblies to provide a chopped voltage to the electric motor, wherein at least one of the first switch assembly and the second switch assembly includes a set of four diodes in a full-wave rectifier configuration.

20. The motor assembly of claim 19, wherein the first transistor and the second transistor include at least one of a snubbered IGBT element and a MOSFET.

21. The motor assembly of claim 19, wherein the control circuit is operable to supply a speed command to control the motor assembly, and includes at least one of an EMI filter, a power supply, a driver circuit, a current limiter, a deadband generator, an under-voltage lockout circuit, and a PWM generator.

22. The motor assembly of claim 19, wherein the control circuit includes a low voltage circuit, a power line circuit, an isolator barrier to at least partially separate the power line circuit and the low voltage circuit, and external controls.

23. The motor assembly of claim 22, wherein the power line circuit is operable to relay power from a power line to the electric motor and includes at least one of an EMI filter, a driver circuit, and a first power supply.

24. The motor assembly of claim 22, wherein the low voltage circuit includes at least one of a current limiter, a deadband generator, a PWM generator, and under-voltage lockout circuit, a PWM to DC converter circuit, and a second power supply, and wherein the low voltage circuit interacts with the external controls to receive at least one of a DC voltage to operate the low voltage circuit and a speed command to operate the electric motor.

25. The controller of claim 19, wherein at least one of the first switch assembly and the second switch assembly is configured to be a bidirectional switching element.

26. A controller for controlling an electric motor, the controller comprising:

a first switch assembly connectable in a series configuration with the motor, the first switch assembly having a first transistor configured to control the first switch assembly at least between a first state and a second state;

a second switch assembly connectable in a parallel configuration with the motor, the second switch assembly having a second transistor configured to control the second switch assembly at least between the first state and the second state; and a control circuit electrically connected to the first transistor and to the second transistor to control the first switch assembly and the second switch assembly, respectively, the control circuit configured to control the first and second switch assemblies for providing a chopped voltage to the motor, wherein the control circuit is operable to supply a speed command to control the first switch assembly and the second switch assembly, and includes at least one of an EMI filter, a power supply, a driver circuit, a current limiter, a deadband generator, an under-voltage lockout circuit, and a PWM generator.

27. The controller of claim 26, wherein at least one of the first switch assembly and the second switch assembly is configured to be a bidirectional switching element.

28. The controller of claim 26, wherein the first transistor and the second transistor include at least one of a snubbered IGBT element and a MOSFET.

29. A controller for controlling an electric motor, the controller comprising:

a first switch assembly connectable in a series configuration with the motor, the first switch assembly having a first transistor configured to control the first switch assembly at least between a first state and a second state;

a second switch assembly connectable in a parallel configuration with the motor, the second switch assembly having a second transistor configured to control the second switch assembly at least between the first state and the second state; and a control circuit electrically connected to the first transistor and to the second transistor to control the first switch assembly and the second switch assembly, respectively, the control circuit configured to control the first and second switch assemblies for providing a chopped voltage to the motor, wherein the control circuit includes a low voltage circuit, a power line circuit, an isolator barrier to at least partially separate the power line circuit and the low voltage circuit, and external controls.

30. The controller of claim 29, wherein at least one of the first switch assembly and the second switch assembly is configured to be a bidirectional switching element.

31. The controller of claim 29, wherein the first transistor and the second transistor include at least one of a snubbered IGBT element and a MOSFET.

32. The controller of claim 29, wherein the power line circuit is operable to relay power from a power line to the motor and includes at least one of an EMI filter, a driver circuit, and a first power supply.

33. The controller of claim 32, wherein the low voltage circuit includes at least one of a current limiter, a deadband generator, a PWM generator, and under-voltage lockout circuit, a PWM to DC converter circuit, and a second power supply, and wherein the low voltage circuit interacts with the external controls to receive at least one of a DC voltage to operate the low voltage circuit and a speed command to operate the motor.

* * * * *